2,966,515

OXIDATION PROCESS FOR THE PREPARATION OF TERTIARY ALKYL BENZOIC ACID

Robert S. Barker, Port Washington, and Alfred Saffer, Bayside, N.Y., assignors to Mid-Century Corporation, Chicago, Ill., a corporation of Delaware No Drawing. Filed Jan. 20, 1958, Ser. No. 709,799

8 Claims. (Cl. 260—524)

This invention relates to an improved process for the preparation of aromatic carboxylic acids and has particular reference to a process for the preparation of alkyl-substituted benzoic acids having one or more tertiary alkyl substituents directly attached to the benzene ring. In a particular aspect, this invention relates to an improved process for the production of tertiary butyl benzoic acid in high yield by the selective oxidation of benzene hydrocarbons having substituted on the benzene ring a tertiary alkyl group and a lower non-tertiary group, such as the methyl group. More particularly this invention relates to a process for the selective catalytic oxidation of tertiary butyl toluene with molecular oxygen in the liquid phase to produce high yields of tertiary butyl benzoic acid under conditions which lead to little or no formation of dicarboxylic acid impurities.

It is known to oxidize tertiary alkyl-substituted compounds such as tertiary butyl toluene to tertiary butyl benzoic acid by means of chemical oxidants such as chromic acid. However, the use of chemical oxidizing agents such chromic acid, nitric acid, potassium permanganate or the like, is too expensive to provide a commercially feasible method of preparing aromatic carboxylic acids. More recently, a process for the selective oxidation of tertiary alkyl-substituted aromatic compounds such as tertiary butyl toluene to tertiary butyl benzoic acid has been patented (U.S. 2,578,654). In accordance with the teachings of this patent, tertiary alkyl benzoic acids can be prepared by oxidation of the corresponding tertiary alkyl toluene at temperatures within the range of from 130° C. to about 225° C. under pressure of up to about 100 p.s.i.g. in the presence of a soluble salt of a heavy metal as oxidation catalyst.

It has been found, however, that the process taught in this patent suffers a number of serious drawbacks. In the first place, the reaction proceeds at a relatively slow rate requiring excessively long periods of time to obtain commercially desirable conversions. For example, in the oxidation of tertiary butyl toluene at 135° C. periods of time up to about 18 hours are required and even at temperatures as high as 165° C. periods of time of up to about 5 hours are indicated as desirable. In the second place, the percent conversion based upon the total feedstock treated is relatively low, that is, only from 50 to 70% and is preferably kept below 70% according to the teachings of the patent. Operation in accordance with the teaching of the patent thus requires recovery and recycle to the oxidation reaction zone of unconverted aromatic hydrocarbon feedstock resulting in a complex reaction system and an expensive process.

A primary object of the present invention is the provision of a process that will provide for substantially theoretical conversion of tertiary alkyl-substituted benzene hydrocarbons to the corresponding tertiary alkyl benzoic acids. Another object of this invention is to provide a process for the preparation of tertiary alkyl-substituted benzoic acids which requires an extremely short reaction time. Still another object of the invention is to provide a process for the preparation of tertiary butyl benzoic acid substantially freed of undesired dicarboxylic acid contaminants. These and other objects of the invention will be apparent from the ensuing description thereof.

In accordance with the present invention, tertiary-alkyl substituted benzoic acids are prepared by reacting a tertiary alkyl-substituted mononuclear aromatic hydrocarbon in the liquid phase with molecular oxygen in the presence of a catalyst comprising in conjoint presence bromine and a heavy metal oxidation catalyst. In a preferred embodiment of the invention, tertiary butyl toluene is oxidized in a solvent comprising a monocarboxylic acid having from 2 to 8 carbon atoms in the molecule.

Hydrocarbon feedstocks which can be oxidized in accordance with the present invention include tertiary alkyl-substituted mononuclear aromatic hydrocarbons having one or more tertiary alkyl groups which are attached to the benzene ring at the site of the tertiary carbon atom. That is to say, the carbon atom of the tertiary alkyl group adjacent to the benzene ring is free of hydrogen substituents. Additionally, the mononuclear aromatic hydrocarbon feedstock is substituted with an oxidizable lower alkyl group having at least one hydrogen on the carbon atom adjacent to the ring, that is, a lower non-tertiary or primary or secondary alkyl group. The non-tertiary alkyl group may contain from 1 to 4 carbon atoms, and includes such group as methyl, ethyl, n-propyl, isopropyl, n-butyl and secondary butyl. Among these methyl and ethyl constitute a preferred group. Such feedstocks include, for example, the isomeric tertiary butyltoluenes including ortho-tertiary butyltoluene, meta-tertiary butyltoluene and para-tertiary butyltoluene, tertiary butyl ethylbenzene, tertiary butyl isopropylbenzene, di-tertiary butyltoluene, tertiary amyltoluene, tertiary octyltoluene, tertiary dodecyltoluene and the like. In general, tertiary alkyl substituents having from 4 to about 20 carbon atoms may be employed. One or more of such tertiary alkyl groups may be present on the hydrocarbon. The feedstock to be oxidized may comprise a mixture of isomeric tertiary substituted mononuclear aromatic hydrocarbons such as mixed isomeric tertiary butyltoluenes. Oxidation of such a mixture results in production of a mixture of isomeric tertiary alkyl benzoic acids which can be employed as such in various commercial applications, or further treated for separation of the individual isomeric benzoic acids.

In the practice of the present invention, it has been found that a catalyst system comprising in conjoint presence bromine and a heavy metal oxidation catalyst and particularly when employed in a carboxylic acid solvent, is an extremely effective and efficient promoter of the oxidation of aliphatic substituents on an aromatic ring. While the oxidation of tertiary alkyl-substituted benzenes having a non-tertiary lower alkyl group can be effected in the presence of such a system under broad conditions of temperature and pressure such as more specifically described hereinafter so as to obtain tertiary alkyl substituted benzoic acids as a major product of the reaction, it has been found that the tertiary alkyl group, hitherto thought to be essentially resistant to oxidation, will nevertheless be oxidized to some extent in the presence of the efficient catalyst system herein employed. In order to avoid the oxidation of the tertiary alkyl group and to obtain a product comprising tertiary alkyl benzoic acid substantially free of dicarboxylic acid impurity, the oxidation according to one embodiment of the present invention is preferably conducted at a temperature below about 200° C. and the oxidation reaction is terminated when not over about 100% of the theoretical amount of oxygen necessary to convert the non-tertiary alkyl substituent of the tertiary alkyl substituted feedstock to a carboxylic acid group is consumed.

By operating the process in accordance with the limitations set out above, it has been found that substantially theoretical conversion to the desired monocarboxylic acid can be obtained in reaction periods of as little as 0.5 to 2 hours in processes employing a batch-type operation. Substantially shorter periods of time can be effectively employed where continuous-type processes are employed by operating at a temperature below about 200° C. and restricting the oxygen uptake to that required for the oxidation of the non-tertiary alkyl group to a carboxylic acid group. For example, conversion of tertiary alkyl toluenes to dicarboxylic aromatic acids can thus be limited to not more than 10% of the feedstock and can even be limited to as little as 1% of the feedstock treated.

While the process of the present invention can be carried out with tertiary alkyl substituted benzenes having a non-tertiary substituent of from 1 to 4 carbon atoms, the ensuing description of the invention will be particularly described with reference to tertiary butyltoluene as a feedstock.

The present process is conducted in the liquid phase. While a solvent need not be employed, in a preferred embodiment of the invention the reaction is conducted in the presence of a solvent comprising a lower monocarboxylic acid as is more particularly described below. Utilization of this solvent as a reaction medium provides certain operating advantages in obtaining high yields of desired product. By conducting the oxidation in such a solvent, the aromatic acid which is formed as a part of the reaction mixture remains substantially dissolved in the reaction to be carried substantially to completion without formation of thick and unmanageable slurries which are difficult to stir and which cannot be brought into effective contact with the oxygen-containing gas employed as a source of molecular oxygen. The absence of such heavy precipitates further avoids plugging and coating over of the gas diffuser which is normally employed to introduce the molecular oxygen-containing gas such as air into the reaction medium. It has been found that when oxidizing tertiary alkyl toluenes, minor amounts of dicarboxylic acids such as isophthalic acids are formed during the reaction. While the amount of such undesired dicarboxylic acids may be kept to a minimum by employing the oxidation conditions described above, the use of a solvent permits substantially complete separation of dicarboxylic acid from the desired tertiary alkyl benzoic acid by filtration of the reaction medium at elevated temperature, for example, at above about 75° C. The filtrate which is thus obtained is essentially free of dicarboxylic acid and may be cooled and the crystallized tertiary alkyl benzoic acid separated therefrom in extremely high purity. Substantially complete recovery of the desired aromatic monocarboxylic acid may be obtained by concentrating the filtered reaction medium prior to crystallization or, alternatively, by removing the monocarboxylic acid solvent by distillation and recovering the residual tertiary alkyl benzoic acid.

In the practice of the invention, the oxidation of tertiary alkyl-substituted toluenes to the corresponding tertiary alkyl-substituted benzoic acids may be effected by reacting such compounds with molecular oxygen, for example, air, in the conjoint presence of catalytic amounts of bromine and a heavy metal oxidation catalyst. Metals of the group of heavy metals shown in the "Periodic Chart of Elements," appearing on pages 56 and 57 of the "Handbook of Chemistry," 8th edition, published by Handbook Publishers, Inc., Sandusky, Ohio (1952) have been found desirably applicable to this invention for furnishing the metal or metal ion portion of the metal-bromine catalyst. Of the heavy metal group, those metals having an atomic number not greater than 84 have been found most suitable. Excellent results are obtained by the utilization of a metal having an atomic number from 23 to 28 inclusive. Particularly excellent results are obtained with a metal of the group consisting of manganese, cobalt, nickel, iron, chromium, vanadium, molybdenum, tungsten, tin and cerium. It has also been found that the catalytic amount of the metal may be either as a single metal or a combination of such metals. The metal may be added in elemental form, as the oxide or hydroxide, or in the form of a metal salt. For example, the metal manganese may be employed as the manganese salt of an aliphatic carboxylic acid such as manganese acetate, manganese oleate and the like, as the manganese salt of an aromatic or cyclo-aliphatic carboxylic acid, for example, manganese naphthenate, manganese toluate, etc., in the form of an organic complex, such as the acetylacetonate, the 8-hydroxy-quinolate and the ethylene diamine tetra-acetate, as well as manganese salts such as the borates, halides and nitrates which are also efficacious.

The bromine may be added in elemental, combined or ionic form. As a source of available bromine, ammonium bromide or other compounds soluble in the reaction medium may be employed. Satisfactory results have been obtained for example, with potassium bromate. Tetra-bromoethane, benzyl bromide and the like may be employed if desired.

The amount of the metal catalyst employed is not critical and may be in the range of from about .01 to about 10% by weight or more based on the aromatic reactant charged. Such catalyst may comprise a single heavy metal or a mixture of two or more heavy metal oxidation catalysts. Where the heavy metal is introduced as a bromide salt, for example, as manganese bromide, the proportions of manganese and bromine will be in their stoichiometric proportions. The ratio of metal to bromine may be varied, for example, within the range from about 1 to 10 atoms of heavy metal oxidation catalyst per atom of bromine to about 1 to 10 atoms of bromine per atom of heavy metal.

The relation of temperature and pressure should be so regulated as to provide liquid phase in the reaction zone. Generally, the pressure may be in the range of atmospheric up to about 1500 p.s.i.g. The liquid phase may comprise all or a portion of the organic reactant or it may comprise a reaction medium in which the organic reactant is dissolved or suspended.

While a solvent need not be employed, in a preferred embodiment of the invention, the oxidation is conducted in the presence of a solvent medium comprising a monocarboxylic acid having from 2 to 8 carbon atoms in the molecule. Such acids which are free of hydrogen atoms attached to tertiary carbon atoms are particularly advantageous as solvent since they have been found to be relatively stable or inert to oxidation in the reaction system. Lower saturated aliphatic monocarboxylic acids having from 2 to 4 carbon atoms in the molecule are particularly effective solvents.

The preferred solvent is acetic acid usually employed in its glacial form. Although acetic acid is preferred, carboxylic acids such as propionic acid, butyric acid, caproic acid, benzoic acid and the like may be employed. Mixtures of these acids may be used. Where all the advantages of an acid medium are not required, other inert media may be used.

Those skilled in the art will appreciate that the amount of solvent employed will be varied over wide limits. The amount of solvent utilized is not critical but typically will be in the range of from about 0.1 to about 10, desirably 0.5 to 4 times the weight of oxidizable starting material.

As to the molecular oxygen-containing gas, there may be employed substantially 100% oxygen gas or gaseous mixtures containing lower concentrations of oxygen, for example, air. Such mixtures preferably have oxygen contents within the range of about 5% by volume to about 20% or more by volume. As such mixtures there may be employed air or air which has been diluted with gases such as nitrogen, $CO_2$ and the like, or corresponding mixtures prepared from substantially pure gaseous oxygen and such inert diluents may be used. The ratio of total oxygen fed into the reaction mixture relative to the tertiary alkyl toluene being oxidized, can be in the range of from about 0.5 to 50 moles or more of oxygen per mol of aromatic material. In a preferred form of the invention where it is desirable to conduct the reaction so as to obtain a minimum of dicarboxylic acid formation, the reaction is terminated when the amount of oxygen consumed is equal to not more than that theoretically required to convert the methyl group of the para-tertiary alkyl toluene to the carboxylic acid group, that is, not more than about 1.5 moles of oxygen per mole of hydrocarbon.

The reaction temperature should be sufficiently high so that the desired oxidation reaction occurs and yet not so high as to cause undesirable charring or formation of tars. Thus temperatures in the range of 50–275° C. desirably from 150–250° C., may be employed. In a preferred form of the invention, the reaction temperature is maintained below about 200° C. in order to avoid oxidation of the tertiary alkyl substituent and in order to prevent formation of undesired dicarboxylic acid product. Lower temperatures within the indicated range may be desirably employed when pure oxygen or oxygen enriched air is used as the source of molecular oxygen.

In order to facilitate a clear understanding of the invention, the following preferred specific embodiments are described in detail.

EXAMPLE 1

The process is conducted in an apparatus having in combination a corrosion resistant pressure oxidation reactor and a water cooled condenser mounted above the reactor. The reaction section is wound with Nichrome ribbon to a height of about ⅓ the reactor height. When the oxidation is in progress, air under pressure is admitted to the reactor through a gas distributor located just at the bottom of the reactor. Vent gases exit through a tube at the top of the condenser and pass through a needle control valve, a mercury-in-glass flow meter and a Dry Ice trap prior to venting to the atmosphere. The reactor is charged by adding weighed amounts of each reactant through the top of the condenser, which is then closed and the reactor pressure raised to about 400 p.s.i.g. with air. Thus, the reactor is charged with 100 parts para-tertiary butyl toluene, 50 parts of acetic acid, 1 part of manganese acetate and 0.75 part of ammonium bromide. The pressure is set at 400 p.s.i.g. and the reactor section heated to 205° C. The exit control valve is adjusted so that the flow rate of gas through the exit flow meter is 3000 volumes per hour per volume of reaction mixture. When the temperature reaches 205° C. the external heating is halted and the temperature rises because of the exothermicity of the reaction. After the initial reaction, external heat is applied to maintain a reaction temperature of 200° C. to 215° C. for 2 hours. Upon completion of the reaction, as shown by 20 to 21% oxygen content (Orsat Gas Analysis) of the exit gas, the reactor is allowed to cool to about 85° C. and depressured. The reactor contents were then further cooled to room temperatures and filtered. A yield of 104 weight percent of para-tertiary butyl benzoic acid was obtained.

EXAMPLE 2

The procedure of Example 1 was repeated employing 150 parts of caproic acid in place of acetic acid and conducting the oxidation reaction at 250° C. After oxygen uptake had substantially ceased, the reactor was depressured and the reactor contents filtered at about 85° C. The solids collected were washed with acetic acid and dried to give a 10% weight yield of terephthalic acid. A yield comparable to that of Example 1 of tertiary butyl benzoic acid was obtained by crystallization from the mother liquors.

EXAMPLE 3

A reactor such as described in Example 1 was charged with 70 g. (0.34 mole) of di-tertiary butyltoluene, 210 g. of glacial acetic acid, 3.0 wt. percent of a mixture of cobalt acetate and manganese acetate and 0.28 wt. percent of ammonium bromide (weight percent of catalyst components based on hydrocarbon). The resultant mixture was heated to 180–185° C. and air introduced while maintaining the reactor at a pressure of 310 p.s.i.g. The reaction was very rapid and essentially complete in eighteen minutes. Oxidation was continued for an additional 10 minutes, during which time it became evident that the tertiary butyl groups were being attacked slowly. Total oxygen consumption after 28 minutes was 114% of that required to oxidize the methyl substituent to a carboxylic acid group. The reaction mixture was treated with decolorizing carbon, cooled to 15° C., and the crystalline material (40.5 g.) separated by filtration. The mother liquors were evaporated to dryness and the residual solids (39.0 g.) combined with the filter cake. Combined solids had an acid number of 245 (theory for di-tertiary butyl benzoic acid—240) and contained less than 0.5% of dicarboxylic acid. The yield was 99 mole percent.

EXAMPLE 4

In similar manner 75 gm. of tertiary octyltoluene (prepared by alkylation of toluene with diisobutylene and analyzing 87% by weight of para-tertiary octyltoluene) was oxidized in 150 gm. of glacial acetic acid in the presence of a mixture of cobalt acetate, manganese acetate and ammonium bromide. The oxidation was effected with air at 160–180° C. and at a pressure of from 280–375 p.s.i.g. After 100 minutes, the oxygen content of the effluent gases reached 19.5%. Filtration of the reaction product at 90° C. yielded about 2.6 mole percent of terephthalic acid. The filtrate was cooled to 15° C. then filtered and about 40 mole percent of tertiary octyl benzoic acid having an acid number of 236 was recovered as filter cake. Additional quantities of tertiary octyl benzoic acid could be recovered from the filtrate.

EXAMPLE 5

In order to show the effect of lower temperature, and limited oxygen input on the preparation of tertiary butyl benzoic acid, four oxidation runs were conducted in an apparatus such as described in Example 1. In each case, 74 grams (0.5 mole) para-tertiary butyltoluene, 150 grams glacial acetic acid, 0.8 weight percent of a mixture of cobalt acetate and manganese acetate and 0.27 weight percent ammonium bromide (weight percent of catalyst components based on tertiary butyltoluene) were charged to the reactor. Temperature and pressure were controlled as indicated in the table and oxygen consumption determined by analysis of the exit gases. The product was worked up by filtering the hot reaction mixture at about 85° C. to remove the terephthalic acid formed during the reaction, followed by precipitation of tertiary butyl benzoic acid by chilling and filtering the mother liquors. The filtrate obtained after crystallization of tertiary butyl benzoic acid was in each case flash distilled to obtain a residue from which additional quantities of para-tertiary butyl benzoic acid were recovered by water extraction.

The results given in the table clearly show a decrease of the terephthalic acid formed with decreasing reaction temperature and a corresponding increase in yield of para-tertiary butyl benzoic acid. Best results were obtained in run 4 in which the oxidation was carried out at 177° C. and the oxidation reaction terminated when oxygen consumption reached theoretical, that is, the amount theoretically necessary to convert the methyl group of tertiary butyl toluene to the carboxylic acid group. While the reaction in run number 4 was carried out over a 50 minute period, the calculated oxygen con-

Table
OXIDATION OF TERT-BUTYL TOLUENE

| Run No. | Temp., °C. | Press., p.s.i.g. | Time, min- | O₂ Consump., percent of theory [1] | Product Distribution, Mol Percent | | |
|---|---|---|---|---|---|---|---|
| | | | | | Tert-Butyl Benzoic Acid | Terephthalic Acid | Non-Acid |
| 1 | 220 | 440 | 120 | 212 | 66.0 | 26.0 | trace. |
| 2 | 205 | 425 | 70 | 132 | 86.0 | 8.0 | trace. |
| 3 | 192 | 390 | 90 | 117 | 85 | 3.5 | trace. |
| 4 | 177 | 305 | 50 | 99 | 96.5 | 1.2 | trace. |

[1] Calculated for oxidation of the methyl group.

sumption was actually 95% of theory after 25 minutes indicating the rapid and effective oxidation characteristics of the catalyst system employed.

EXAMPLE 6

A jacketed, corrosion-resistant reaction vessel fitted with an overhead condenser was charged with 198 g. (1.34 mole) of p-tertiary butyl toluene, .04% by weight of cobalt as cobalt naphthenate and 1.5% by weight of tetrabromoethane. The reactor was heated to 165° C. and air passed through the reaction mixture at a rate of 330 liters/hour for 2 hours. Water produced during the course of the reaction was taken overhead and separated. At the end of the reaction period, the reactor contents were cooled to about 10° C., and the tertiary butyl benzoic acid crystallized from the mixture. Additional quantities of acid were recovered by distilling unconverted p-tertiary butyl toluene from the filtrate. It was found that 144 gm. of tertiary butyl toluene had been consumed in forming 133 g. of acid of about 90% purity or a yield of about 70 mole percent based on hydrocarbon consumed.

When the process described above was carried out under identical conditions in the absence of tetrabromoethane, a yield of 95 g. of acid was obtained and 48 g. of p-tertiary butyl toluene recovered. The yield was 53 mole percent based on hydrocarbon consumed.

The process of the present invention can be conducted on a continuous, intermittent or batch basis. Water may be removed to maintain substantially anhydrous reaction conditions if desired, e.g. by distillation during the oxidation by initial or intermittent addition of acetic anhydride to the reaction mixture, or the like.

While the invention has been particularly described with respect to the oxidation of tertiary alkyl substituted toluenes, it will be understood that tertiary alkyl substituted benzenes having a non-tertiary lower alkyl substituent can be similarly oxidized to the corresponding tertiary alkyl benzoic acids. Thus tertiary alkyl ethylbenzene, tertiary alkyl n-propylbenzene, tertiary alkyl n-butylbenzene, and the like, having a non-tertiary alkyl group of from 1 to 4 carbon atoms may be effectively employed as feedstock in the process.

Desirable or comparable results may be achieved with various modifications of the foregoing within the broad ranges set forth herein. Thus, the pressure should be sufficient to maintain a liquid phase which, if a solvent is used, should contain at least some of the said solvent. Generally, the pressure may be in the range of atmospheric up to about 1500 p.s.i.g. Where acetic acid is employed as a solvent, pressures in the range of about 200 to about 500 p.s.i.g. are effectively employed.

In view of the foregoing disclosures, variations and modifications of the invention will be apparent to those skilled in the art, and it is intended to include within the invention all such variations and modifications except as do not come within the scope of the appended claims.

We claim:
1. A process for the preparation of tertiary alkyl benzoic acid which comprises reacting a benzene hydrocarbon, having as substituents on the benzene ring at least one tertiary alkyl group of from 4 to 20 carbon atoms and one but not more than one lower alkyl group selected from the class consisting of primary and secondary alkyl groups having from 1 to 4 carbon atoms, with molecular oxygen-containing gas in the liquid phase at a temperature between about 50° C. and about 200° C. and a pressure from atmospheric to 1500 p.s.i.g. in the conjoint presence of bromine and a heavy metal oxidation catalyst, the heavy metal catalyst being present in an amount between about 0.01 and about 10% by weight based on said benzene hydrocarbon and the bromine being present in a ratio of from about 0.1 to about 10 gram atoms per gram atom of metal in said heavy metal catalyst and separating said tertiary alkyl benzoic acid substantially free of dicarboxylic acid impurities.

2. A process as defined in claim 1 wherein the heavy metal has an atomic number of 23 to 28 inclusive.

3. A process as defined in claim 1 wherein the heavy metal is selected from the group consisting of manganese, cobalt and mixtures thereof.

4. A process for the preparation of tertiary alkyl benzoic acid which comprises reacting tertiary alkyl toluene wherein the tertiary alkyl group is the only substituent and contains from 4 to 20 carbon atoms with molecular oxygen-containing gas in the liquid phase in an alkanoic acid solvent having from 2 to 8 carbon atoms in the molecule at a temperature between about 50° C. and about 200° C. and a pressure from atmospheric to 1500 p.s.i.g. in the conjoint presence of bromine and a heavy metal oxidation catalyst, the heavy metal catalyst being present in an amount between about 0.01 and about 10% by weight based on said tertiary alkyl toluene and the bromine being present in a ratio of from about 0.1 to about 10 gram atoms per gram atom of metal in said heavy metal catalyst and separating tertiary alkyl benzoic acid substantially free of dicarboxylic acid impurities.

5. The process of claim 1 wherein the solvent comprises acetic acid.

6. The process of claim 4 wherein the tertiary-alkyl toluene is para-tertiary butyl toluene.

7. The process of claim 4 wherein the tertiary-alkyl toluene is di-tertiary butyl toluene.

8. The process of claim 4 wherein the tertiary-alkyl toluene is tertiary-octyl toluene.

References Cited in the file of this patent
UNITED STATES PATENTS

| | | |
|---|---|---|
| 2,444,924 | Farkas et al. | July 13, 1948 |
| 2,578,654 | Hearne et al. | Dec. 18, 1951 |
| 2,833,816 | Saffer et al. | May 6, 1958 |